United States Patent [19]
Baba et al.

[11] Patent Number: 6,047,959
[45] Date of Patent: Apr. 11, 2000

[54] AUTOMATIC DOCUMENT FEEDER

[75] Inventors: Kenji Baba; Masaki Fukuda, both of Yamanashi-ken, Japan

[73] Assignee: Nisca Corporation, Yamanashi, Japan

[21] Appl. No.: 08/988,443

[22] Filed: Dec. 11, 1997

[30] Foreign Application Priority Data

| Dec. 12, 1996 | [JP] | Japan | .................................. 8-352320 |
| Apr. 15, 1997 | [JP] | Japan | .................................. 9-114364 |
| Jul. 11, 1997 | [JP] | Japan | .................................. 9-202259 |

[51] Int. Cl.$^7$ .............................. B65H 5/22; B65H 83/00; B65H 85/00; B65H 39/10; G03G 15/00
[52] U.S. Cl. ...................... 271/3.01; 271/3.03; 271/3.05; 271/291; 271/297; 399/373; 399/374
[58] Field of Search ................................ 271/3.01, 3.03, 271/3.05, 9.02, 291, 297; 399/373, 374

[56] References Cited

U.S. PATENT DOCUMENTS

| 5,197,724 | 3/1993 | Kitajima et al. | ........................ 271/3.1 |
| 5,669,056 | 9/1997 | Rubscha | .................................. 399/367 |

FOREIGN PATENT DOCUMENTS

| 0226427 | 10/1986 | Japan | .................................... 271/291 |
| 7-109060 | 4/1995 | Japan . |
| 8-133551 | 5/1996 | Japan . |

*Primary Examiner*—William E. Terrell
*Assistant Examiner*—K W Bower
*Attorney, Agent, or Firm*—Kanesaka & Takeuchi

[57] ABSTRACT

An automatic document feeder includes a paper supply inlet and a first paper ejection outlet disposed above the paper supply inlet, a paper supply path for leading a document supplied from the paper supply inlet to a reading section, and a paper ejection path for leading the document from the reading section to the first paper ejection outlet. The automatic document feeder further includes a circulation path situated between the paper ejection path and the paper supply path for reversing a transfer direction of the document, and a document reversing path connected between the paper ejection path and a second paper ejection outlet different from the first paper ejection outlet for reversing front and rear surfaces of the document. The transfer direction as well as the front and rear surfaces of the document can be changed, as desired.

10 Claims, 16 Drawing Sheets

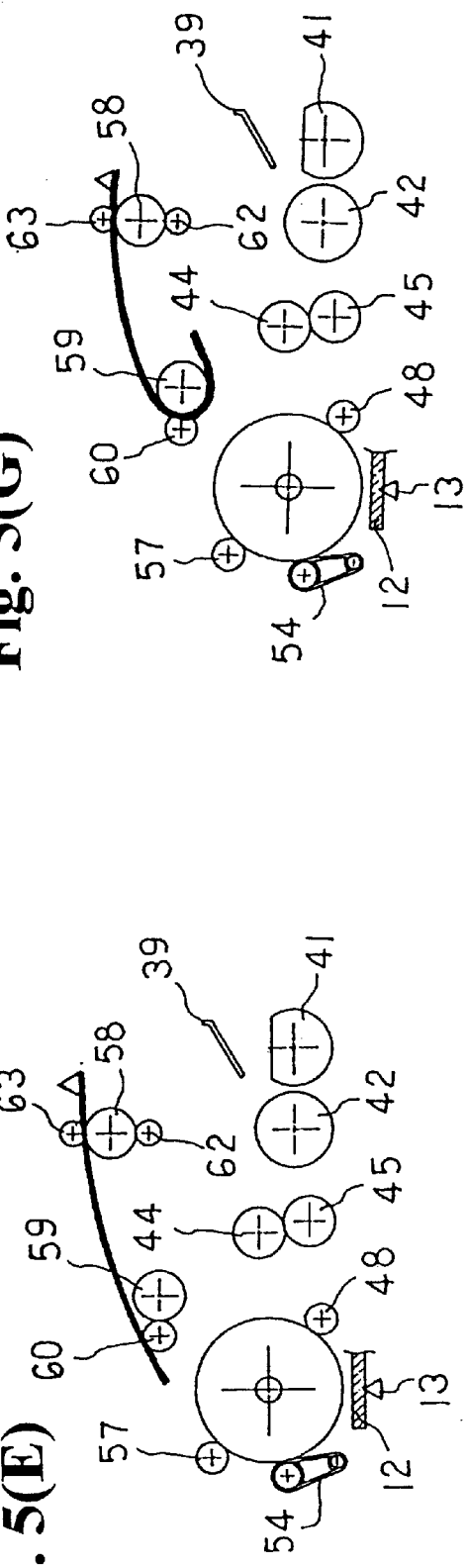
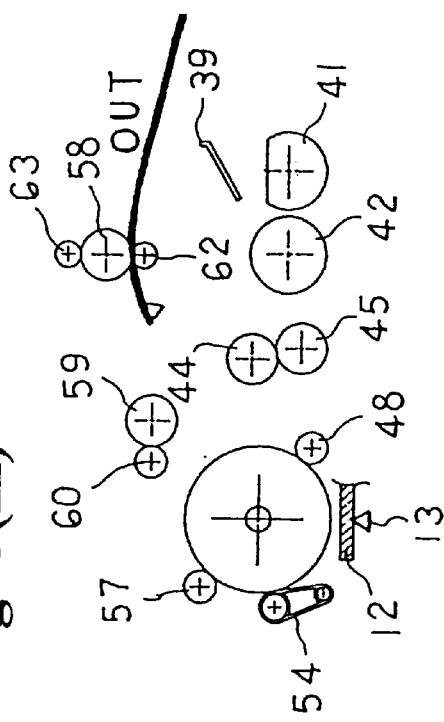
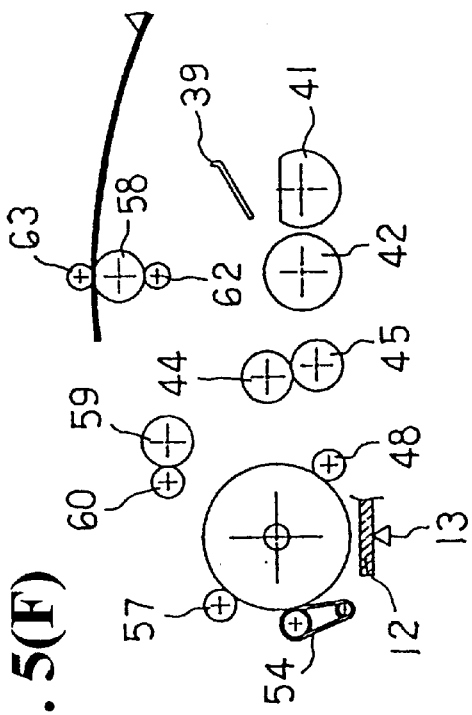
Fig. 5(G)
Fig. 5(H)
Fig. 5(E)
Fig. 5(F)

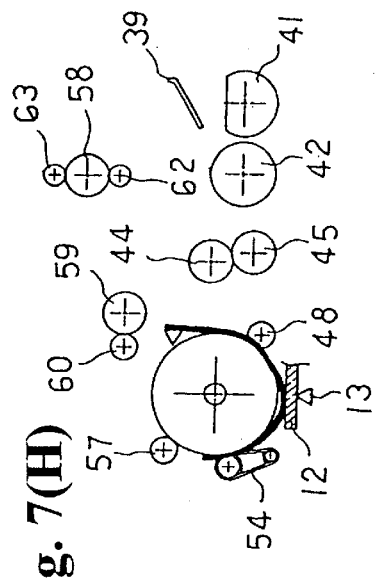
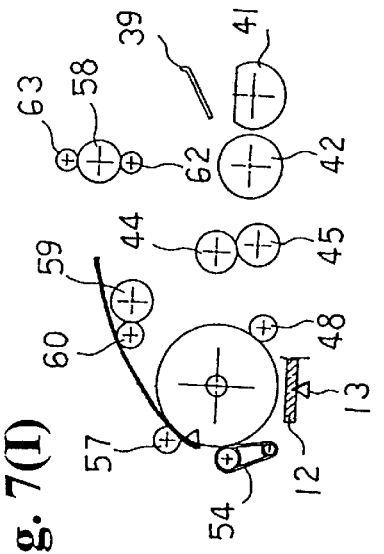
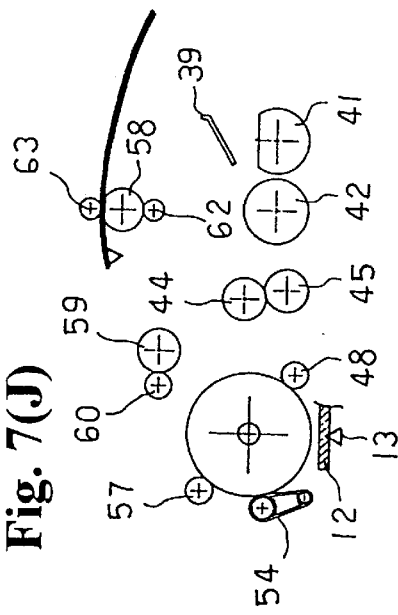
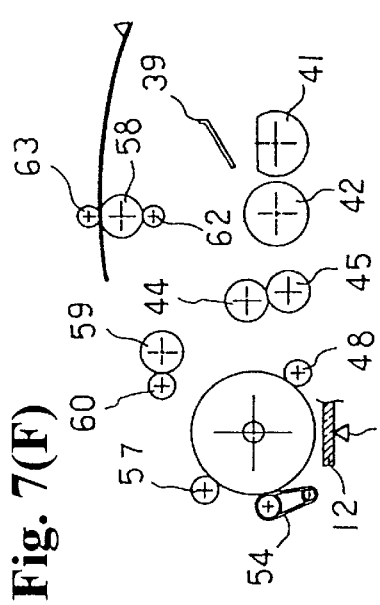
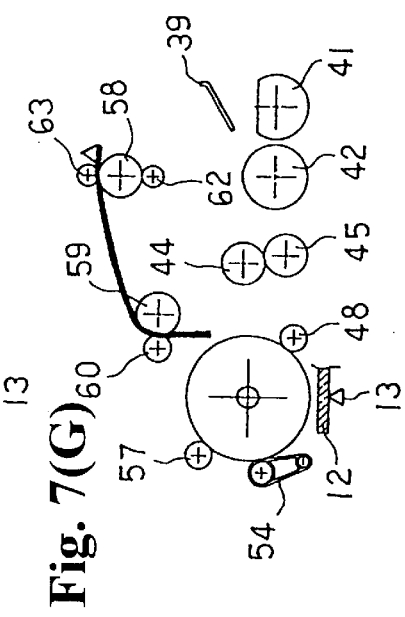

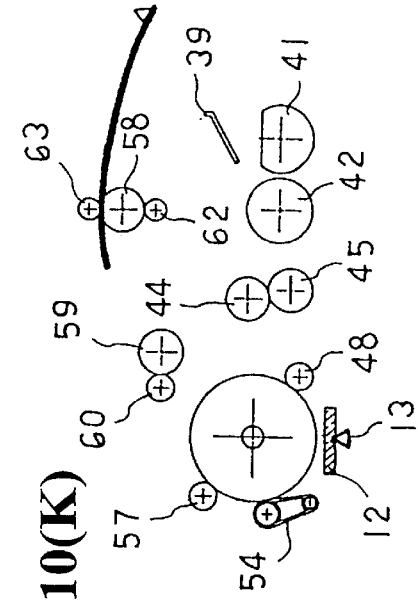
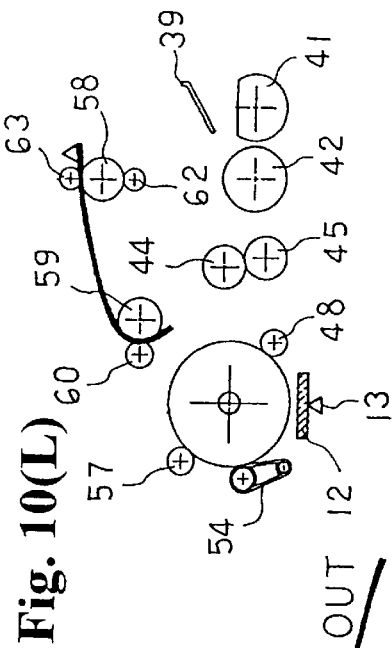
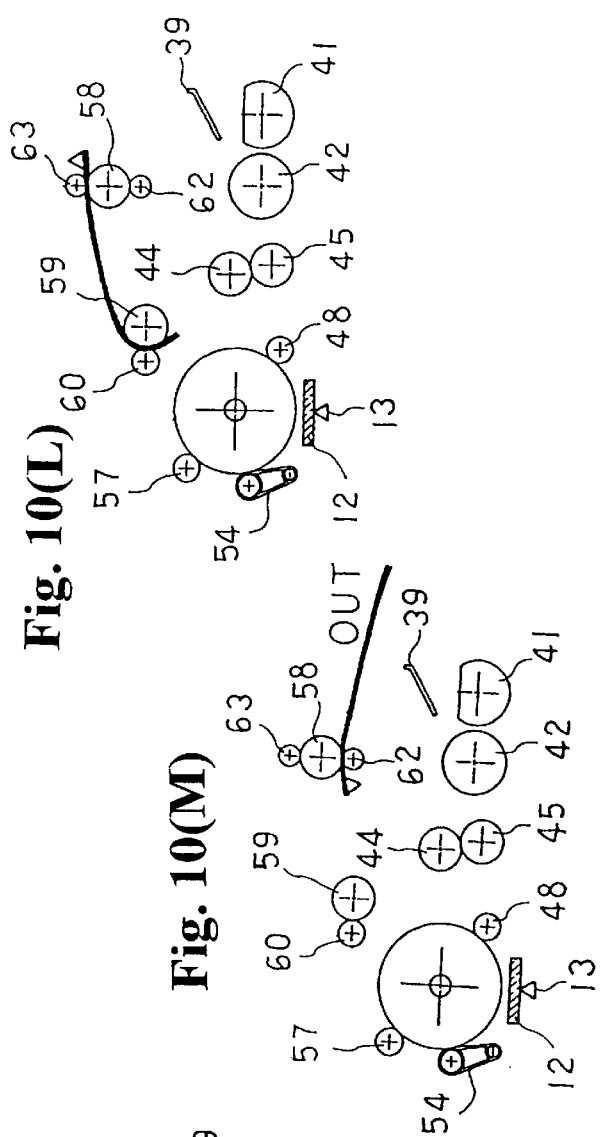
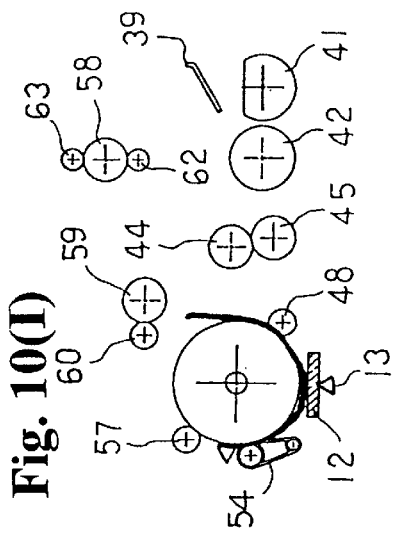
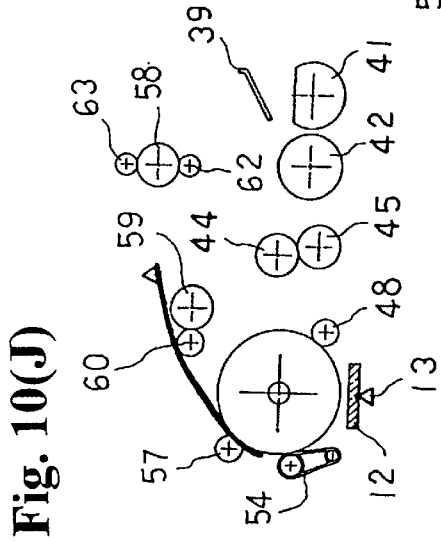

AUTOMATIC DOCUMENT FEEDER

BACKGROUND OF THE INVENTION AND RELATED ART STATEMENT

The present invention relates to an automatic document feeder which is disposed in an image forming apparatus, such as an image reading apparatus and an image printing apparatus, and automatically processes operations ranged from supplying a document to ejecting the same in order to form an image.

Conventionally, there has been known an image forming apparatus provided with an automatic document feeder which is disposed in a main body of the automatic document feeder and automatically processes operations ranged from supplying a document to ejecting the same in order to form an image. And, in the automatic document feeder, especially, in case there is a plurality of original documents, it is preferable to eject the documents after being read in the same order as in the documents before being read.

On the other hand, in accordance with becoming a higher speed process in recent years, in place of a system in which the document is once stopped on a reading section to read a document by parallel transfer (scanning) of the reading apparatus along the document, there has been known an apparatus which adopts a so-called sheet-through system, that is, a system in which the document passes through the reading section of the reading apparatus to read an image of the document while the reading apparatus is fixed at the predetermined position.

As the automatic document feeder for the image forming apparatus, there has been generally known an apparatus disclosed in Japanese Patent Publication (KOKAI) No. H8-133551. By referring to FIG. 11, a summary of this automatic document feeder is explained below.

In FIG. 11, numeral 1 designates an image forming apparatus main body; 2 designates a platen glass which is disposed in the main body 1 for placing the document thereon in case of reading the thick document such as a book; 3 designates reading means, such as CCD, for reading the document on the platen glass 2; 4 designates an automatic document feeder attached to the image forming apparatus main body 1 to be able to open and close such that it covers the platen glass 2. Incidentally, 5 designates a platen glass for reading the document in case of automatic document feeding by using the automatic document feeder 4.

Here, the reading means 3 reads a document, which is transferred by automatic document feeding, at a predetermined reading position, and also, moves to read the document in case the thick document such as a book is placed on the platen glass 2.

The automatic document feeder 4 is formed of a platen cover 7 having a white sheet 6 pressing a thick document such as a book onto the platen glass 2, a document supply table 8, an ejection table 7b formed on an upper surface of the platen cover 7, and a document transfer section 9; and is disposed to freely open and close with respect to the platen glass in the image forming apparatus.

In the document transfer section 9, documents placed on the document supply table 8 are separated into one sheet by separating means 9h disposed in a document supply part 9a, and supplied, then a leading edge of the document abuts against register means 9i so as to align the documents. Then, the document transferred by the register means 9i to a transfer part 9c is supplied by rollers 9j and 9f, which are pressed against a feed roller 9b, to a reading section of the reading means 3 to be read. The read document is supplied by the feed roller 9b and a roller 9g to an ejection part 9e, and ejected onto the ejection table 7b by ejecting means 9k. Further, when a double-sided document is read, the document sent to the ejection part 9e is switched back, and again introduced to the transfer part 9c.

However, in case of reading a double-sided document in the prior art of Japanese Patent Publication No. H8-133551, in order to place the documents onto the ejection tray in the page order, the document is required to pass through the document reading section three times. Thus, even if the preceding document is not read, the document is required to pass through the document reading section; accordingly, even if reading the document is finished, a next document can not be supplied, so that there is a problem that time for exchanging documents can not be reduced.

Also, as an apparatus similar to the apparatus in Japanese Patent Publication No. H8-133551, there is an apparatus provided individually with a reversing ejection part for reversing the document and ejecting the same onto the ejection tray after a second side of the document is read such that the double-sided documents can be arranged in the page order when being ejected on the ejection tray.

In this apparatus similar to the apparatus of Japanese Patent Publication No. H8-133551, in order to transfer a single-sided document and a double-sided document without any problems, a plurality of transfer paths is required, and by providing a plurality of transfer paths, there is caused a problem such that the apparatus becomes complicated and larger, and requires a complicated control mechanism.

Incidentally, in the automatic document feeder of the sheet-through system, since there are digital method and analog method in reading the document by the image forming apparatus, the automatic document feeder is required to be able to apply both methods of reading, that is, it is preferable in view of cost that a single document feeding system can be applied in both the image forming apparatus of the digital method and the image forming apparatus of the analog method, so that mass production and inventory control can be facilitated.

The analog method is a method in which an image of the read document is fixed to a transfer paper at substantially real time when the document passes above the reading means; and the digital method is a method in which the image data of the document is once stored in a memory when the document passes above the reading apparatus, then the image is printed to the transfer paper. In the analog method, in case of making plural copies for the same document, the document is required to pass above the reading apparatus by a number corresponding to the number of the copies; accordingly, there is a problem that time for copying the document is long. In the digital method, it is required to mount a memory for storing image data recorded in a maximum document size which can be copied, for at least one sheet.

Incidentally, as described above, especially in the sheet-through type automatic document feeder, in order to correspond to both the digital image forming apparatus and the analog image forming apparatus, and at the same time, in order to have a plurality of functions such as single-sided document process, double-sided document process, and continuous reading process of the same side, a complicated structure of document paths was inevitable. Also, in accordance with securing the paths and increasing a number of members in order to ensure the complicated structure of the document paths, the apparatus main body becomes large, and moreover, there has been a problem that the cost therefor is extremely increased by complication of controlling the paths and by providing a number of sensors therefor.

Also, in case that a plurality of document sizes is mixed, by the method of detecting the document size on the document tray, only the maximum document size can be detected. Also, in case detecting means for document sizes is disposed in the transfer path of a document transferring apparatus, in order to detect the document size in the automatic document feeder side before reading an image, it is required to secure the long size detection path for allowing the detection of the maximum size which can be copied (such as a longitudinally elongate A3 size), so that the apparatus becomes larger, and there has been a problem that the apparatus is not practical.

The present invention has been made in view of the aforementioned circumstances, and while having plural functions for copying, a construction of document paths is simplified, so as to prevent making the apparatus larger and increasing cost thereof in accordance with securing supply paths and ejection paths and increasing a number of the component parts. Also, an object of the invention is to provide an automatic document feeder wherein the document size can be detected by a short supply path before reading an image, and which can be installed on both the digital image forming apparatus and the analog image forming apparatus.

SUMMARY OF THE INVENTION

To achieve the aforementioned object, the gist of the automatic document feeder of the invention is that an automatic document feeder is formed of a paper supply inlet and an paper ejection outlet disposed in upper and lower positions, a paper supply path for leading the document from the paper supply inlet to a reading section, a paper ejection path for leading the document from the reading section to the paper ejection outlet; wherein the automatic document feeder is further provided with a circulation path for reversing a direction of transferring the document, which is connected to the paper ejection path and extended to the paper supply path, and a document reversing path for reversing the front and rear surfaces of the document, which is connected to the paper path and extended to a second paper ejection outlet different from the paper ejection outlet described above.

BRIEF DESCRIPTION OF THE DRAWINGS

FIG. 5(A) through FIG. 5(H) are schematic views showing a flow of the document by time series when one surface of the single-sided document is copied (singularly);

FIG. 7(A) through FIG. 7(J) and FIG. 8(K) through FIG. 8(Q) are schematic views showing a flow of the document by time series when the double-sided document is read from a rear surface thereof;

FIG. 9(A) through FIG. 9(H) and FIG. 10(I) through FIG. 10(M) are schematic views showing a flow of the document by time series when one surface of the single-sided document is copied (plurally)

DETAILED DESCRIPTION OF PREFERRED EMBODIMENTS

Figure 1:
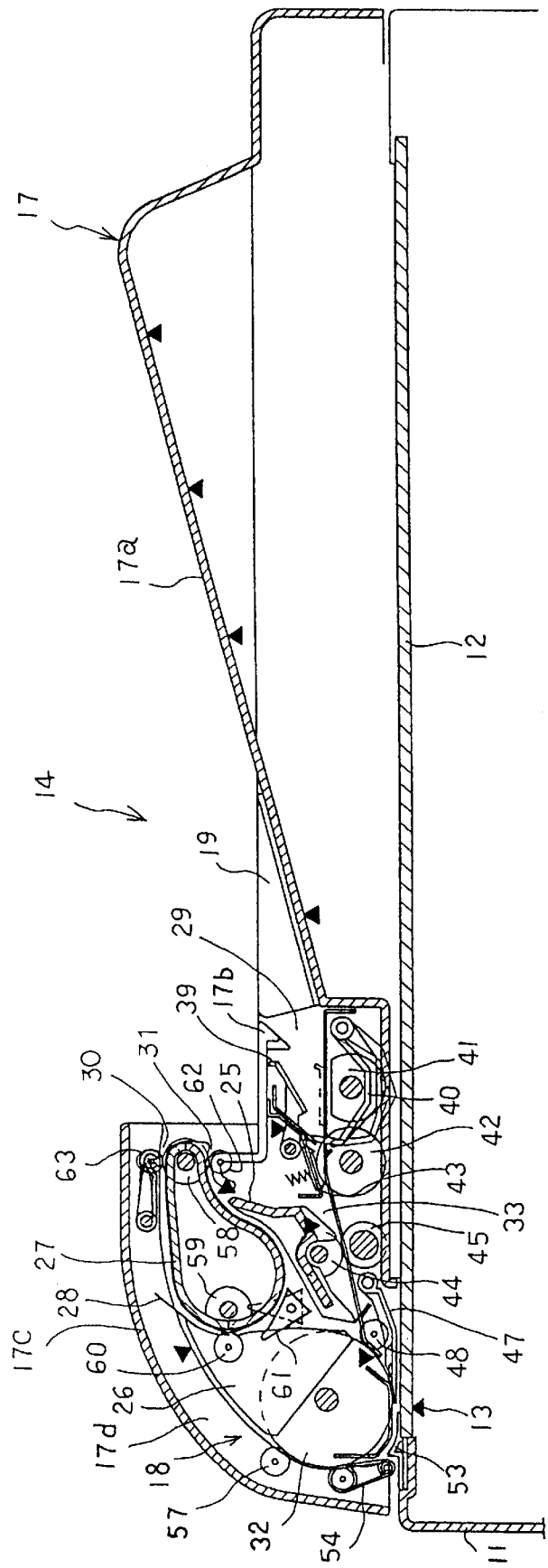
FIG. 1 is a vertical section view of an automatic document feeder of the invention.
Figure 2:
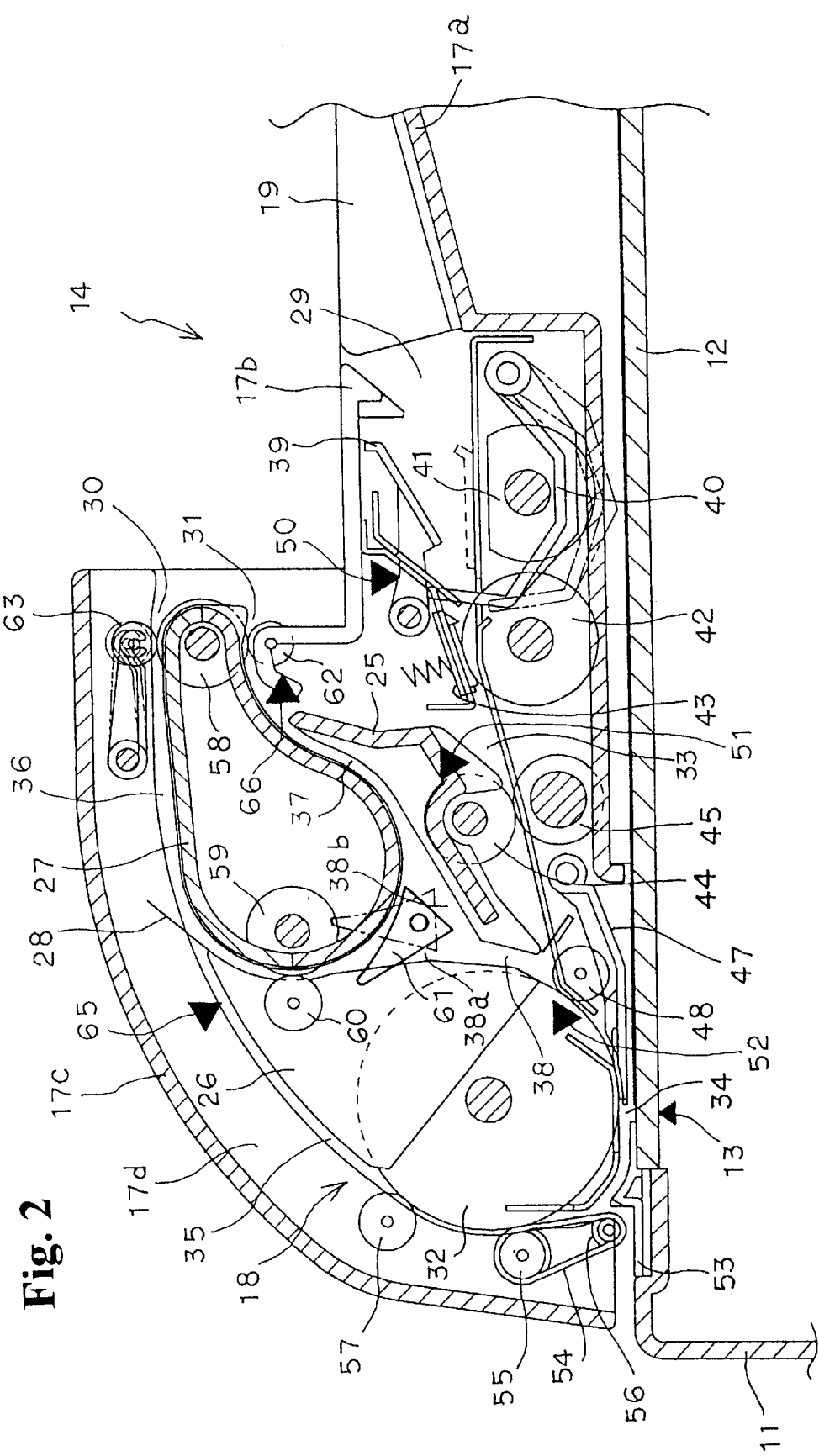
FIG. 2 is an enlarged vertical section view of a main part of the automatic document feeder.

In FIG. 1 and FIG. 2, numeral 11 designates a copier main body; 12 designates a platen glass disposed in the copier main body 11; 13 designates reading means, such as CCD, located on a rear surface side of the platen glass 12; and 14 designates an automatic document feeder rotatably attached to the copier main body 11 so as to cover the platen glass 12. Incidentally, a position of the reading means 13 shown in FIG. 1 and FIG. 2 is a position when automatically feeding the document, and the reading means 13 is fixed at the time of automatic document feeding. Also, in case of the thick document such as a book, the reading means 13 is transferred toward right in the figures so as to read the document.

A cover main body 17 of the automatic document feeder 14 includes a document stack part 17a in which at least a part thereof is inclined, a paper ejection plate 17b located above the stack part 17a, a document transfer part cover 17c for covering a document transfer part 18, and a rib 17d. Incidentally, the document transfer part cover 17c can be opened and closed.

The paper ejection plate 17b supports, between the paper supply inlet 29 and first and second paper ejection outlets 30 and 31, a rear end side of the document ejected from the first and second paper ejection outlets 30 and 31. Thereby, the supplied document on the stack part 17a is distinguished from the ejected document, so that the ejected document can not be inadvertently supplied from the paper supply inlet 29.

Figure 11:
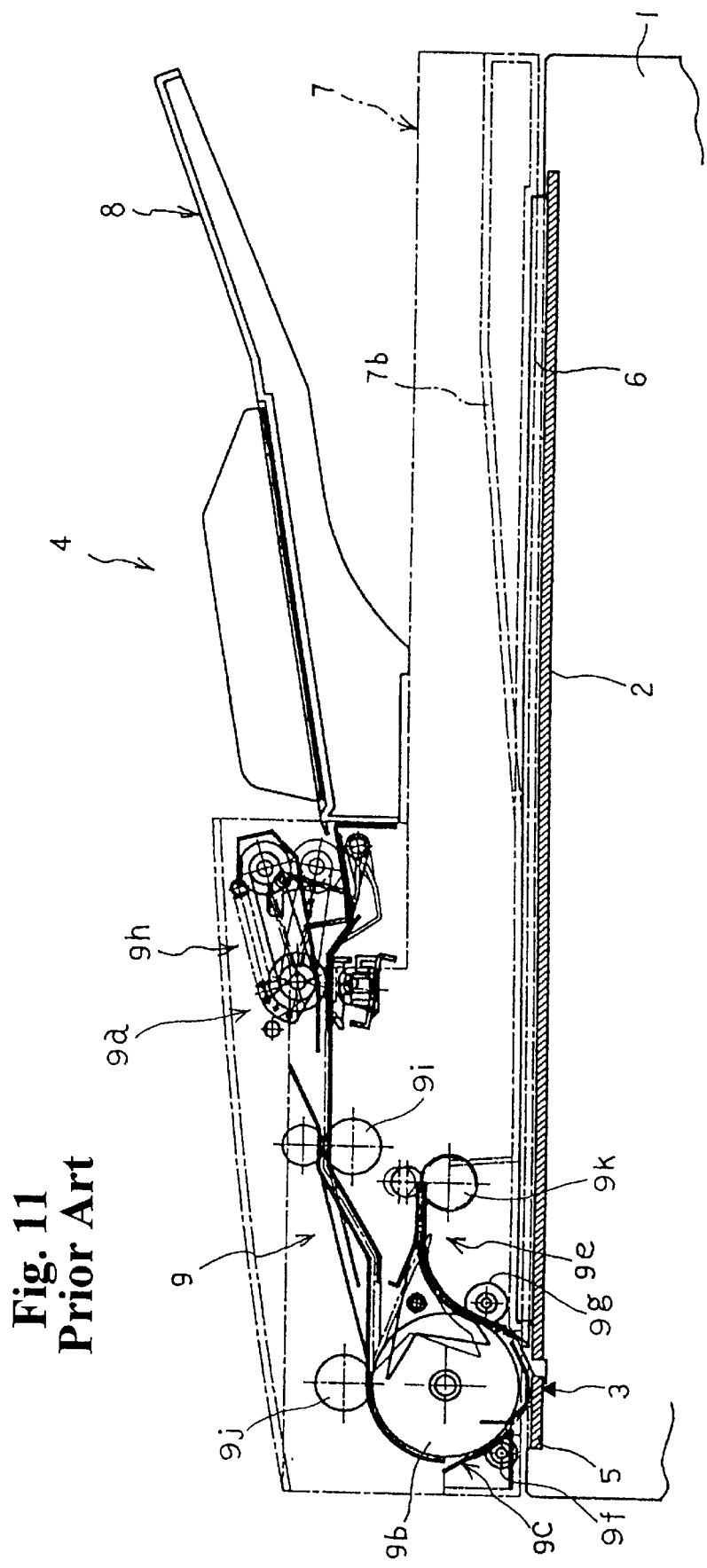
FIG. 11 is a section view of a conventional automatic document feeder.

Therefore, there is no incident such that the document in the paper ejection side is hidden by the supply table 8 as in the conventional automatic document feeder shown in FIG. 11, and accordingly, there is solved an inconvenience such that when the copy sheet is taken, existence of the ejected document hidden by the supply table 8 is overlooked.

Incidentally, the paper ejection plate 17b is not limited to a plate shape as described above, and may be Mylar or a wire rod.

The document transfer part 18 includes a plurality of guide members 25, 26, 27 and Mylar 28, and on a distal end side of the stack part 17a, there is disposed the paper supply inlet 29 for supplying the document to the distal end side. Further, the first paper ejection outlet 30 is formed by the guide member 27 and the rib 17d, and on a lower side thereof, the second paper ejection outlet 31 is formed by the guide member 27 and a rear end of the paper ejection plate 17b. Incidentally, the first and second paper ejection outlets 30 and 31 are disposed above the paper supply inlet 29.

Also, in the document transfer part 18, there is a reading part 34 for reading the document at the reading means 13, and a path extending from the paper supply inlet 29 to the reading part 34 constitutes a paper supply path 33. Also, the reading part 34 is formed by a lower end of a feed roller 32 and the reading means 13, and a transfer path 35 is formed by the feed roller 32 and the rib 17d.

The transfer path 35 is provided to be connected to a first paper ejection path 36 which extends to the first paper ejection outlet 30, and further, there is disposed a second paper ejection path 37 which extends from the first paper ejection path 36 to the second paper ejection outlet 31. A circulation path 38 communicates with the paper supply path 33, and includes a first circulation path 38a used in common with the first paper ejection path 36 and the second paper ejection path 37, and a second circulation path 38b used in common with the second paper ejection path 37.

The Mylar 28 is pushed down by the strength of the document while the document is passing through, and when passing the document is finished, the Mylar 28 is returned naturally by its elasticity as shown in the figures so as to guide to an intermediate part of the paper supply path 33 at the time of sending the document again.

In the paper supply path 33, there are disposed a rotational weight piece 39 provided in the vicinity of the paper supply inlet 29 and pressing the uppermost surface of the document; a document stopper 40 abutting against the leading edge of the document for positioning the document on the stack part 17a; a paper supply roller 41 of a substantially semicircular shape slidingly contacting with the lowermost document on the stack part 17a so as to supply documents; a separation roller 42 and a separation pad 43, which separate and take out the documents supplied by the paper supply roller 41 into one sheet; a register roller 44 and a register auxiliary roller 45, which align the document taken out by the separation roller 42 and the separation pad 43; the feed roller 32 which passes the document supplied from the register roller 44 through the reading part 34; a second register roller 48 which abuts against the periphery of the feed roller 32 to lead the document from the circulation path and 38 to the reading part 34 and to align the document at the same time; and an abutting scale 53 which becomes a standard in case of manually placing the thick document such as a book, and which is also attached to the copier main body 11 to lead the read document to the transfer path 35 in case of transferring the document.

In the transfer path 35, there are disposed a transfer belt 54 which promotes bending of the ejection leading edge of the document and moderates an impact at the supply leading edge of the document; a driving roller 55 and a driven roller 56 for rotationally moving the transfer belt 54; a roller 57 abutting against an outer peripheral surface of the feed roller 32; a forward and reverse roller 58 for reversely sending the document after ejecting the document from one of the first and second paper ejection outlets 30 and 31, or after temporarily sending the document toward an ejection direction; an intermediate driving roller 59 and an intermediate driving auxiliary roller 60 for transferring the document, which are disposed in a common part of the second paper ejection path 37 and the first circulation path 38a; a flapper 61 which switches the direction of the document transferred by the intermediate driving roller 59 and the intermediate driving auxiliary roller 60 between a direction of transferring to the intermediate part of the paper supply path 33 and a direction of transferring to the second paper ejection outlet 31, and which also guides the document from the second paper ejection outlet 31 to the intermediate part of the paper supply path 33; a first paper ejection auxiliary roller 63 which cooperates with the forward and reverse roller 58 at the time of ejecting the document from the first paper ejection outlet 30 or at the time of temporarily transferring a part of the document; and a second paper ejection auxiliary roller 62 which cooperates with the forward and reverse roller 58 at the time of ejecting document from the second paper ejection outlet 31 or at the time of temporarily transferring the part of the document.

Furthermore, the document transfer part 18 includes a paper supply motor M1, a paper ejection motor M2, and a transfer motor M3 so as to drive the aforementioned respective rollers.

Incidentally, in the automatic document feeder, as document size detecting means, there are disposed a width detecting sensor for detecting based on a transfer of a slide-type side guide member 19 for controlling an end of the width direction of the document placed on the stack part 17a, and a plurality of document length detecting sensors for detecting the length of the document placed on the stack part 17a. In case that document sizes of a plurality of documents to be read are the same, according to detected results from these sensor means, the size of the document placed on the stack part 17a is recognized, and the recognized size data is outputted to the copier main body 11 before copying is carried out.

Further, in case that the document sizes of a plurality of documents to be read are different, time or transfer quantity from arrival of a leading edge of the document to passing of a rear edge thereof is detected by a sensor disposed in the paper supply path 33, and based on this detected result and a result detected by a plurality of width detecting sensors disposed in the document width direction perpendicular to the transfer direction of the document, the size of the document is recognized, and the recognized size data is outputted to the copier main body 11 before copying is carried out.

Figure 3:
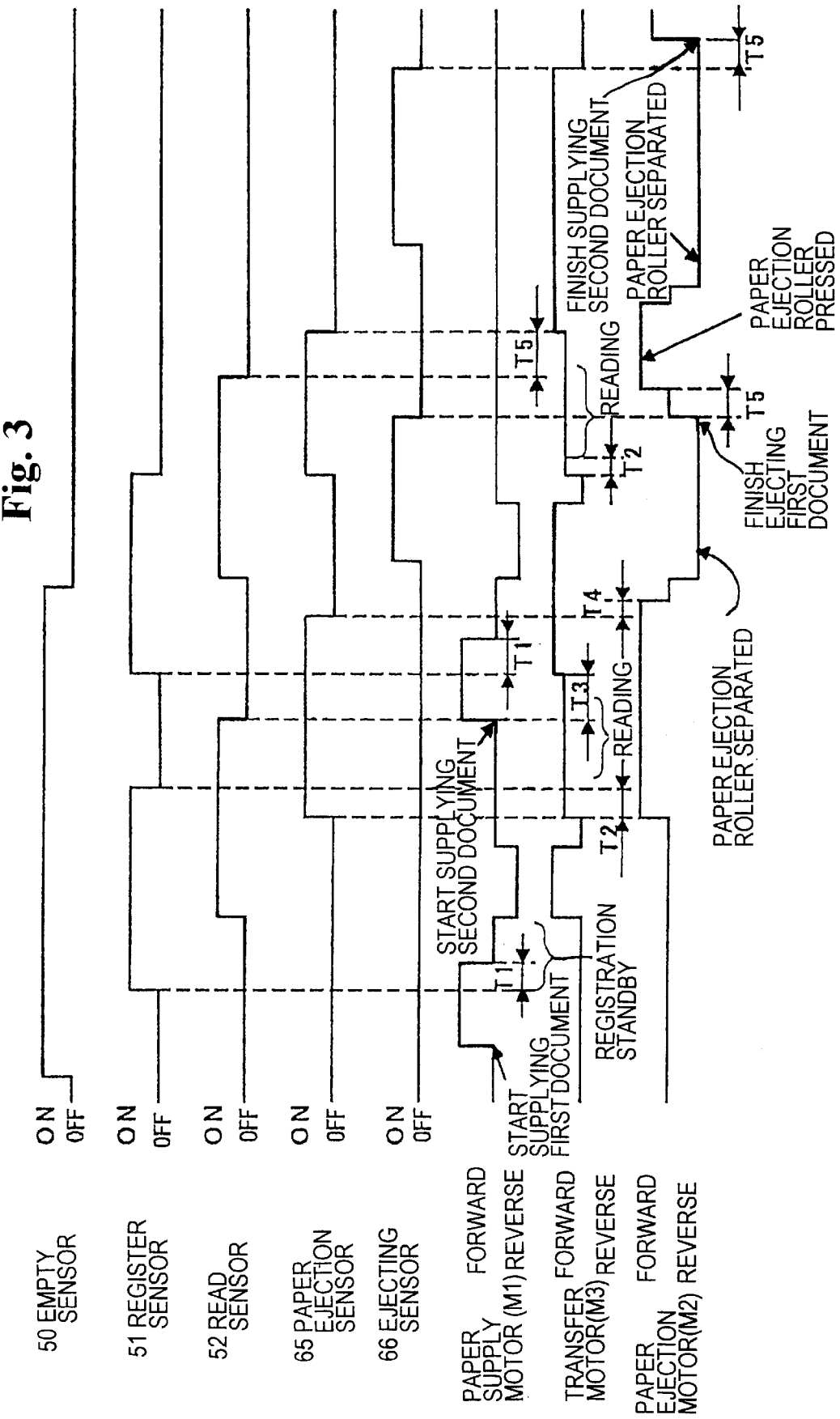
FIG. 3 is a timing chart when one surface of a single-sided document is copied (singularly)
Figure 4:
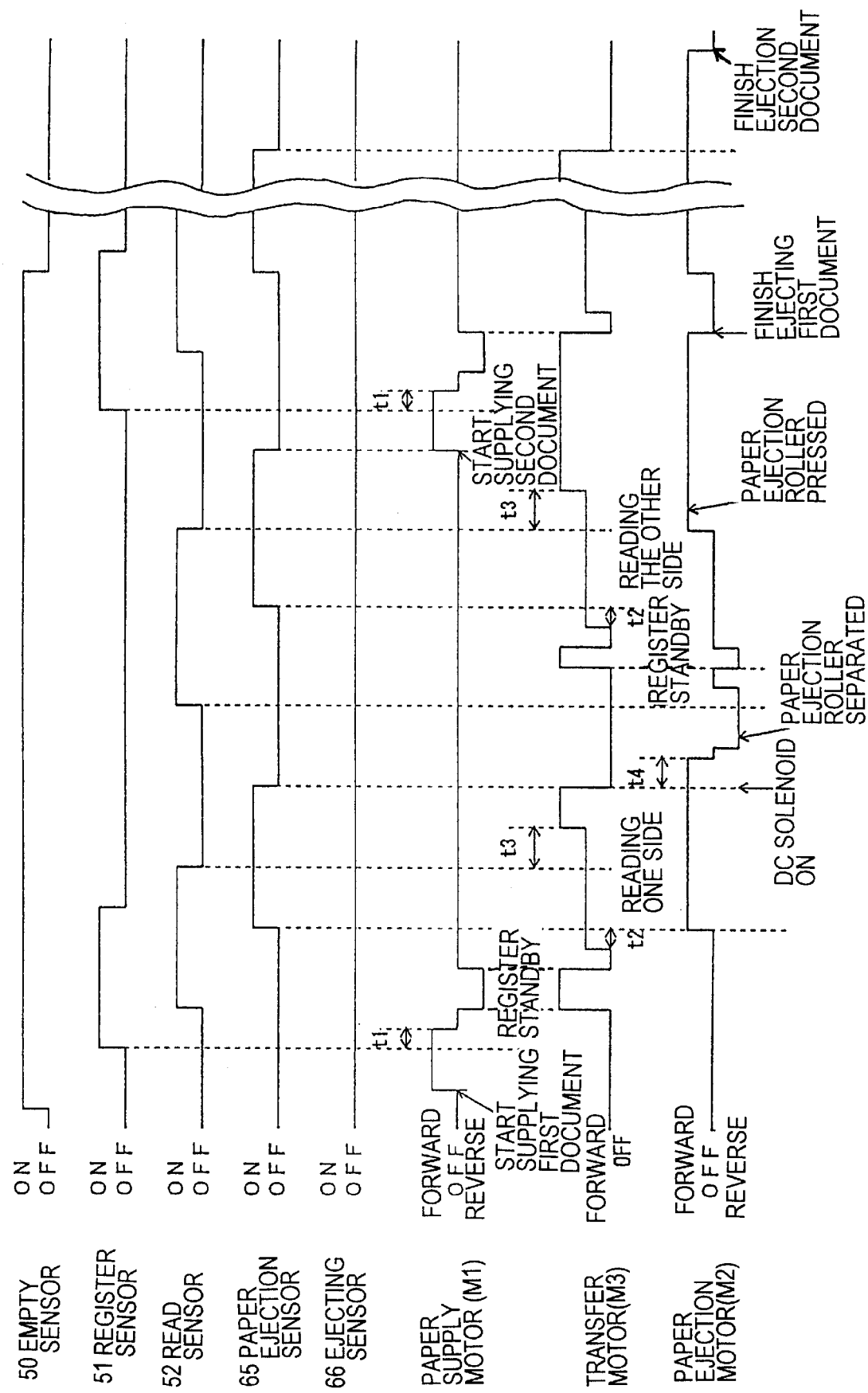
FIG. 4 is a timing chart when a double-sided document is read from a front surface thereof.

Next, operations of the automatic document feeder 14 will be explained by using FIG. 3 and FIG. 4, and also by referring to FIG. 5(a) through FIG. 10(M).

Firstly, by using FIG. 3 and FIG. 5(A) through FIG. 5(H), the case of copying (singularly) two documents, each having one side to be copied is explained hereinafter. In FIG. 3 and FIG. 5(A) through FIG. 5(H), when the document is placed on the stack part 17a of the cover main body 17, an empty sensor 50 is turned on. From this condition, an operation of the document transfer part 18 is started, and the paper supply motor M1 is rotated forward, then the document is supplied by the paper supply roller 41 (referring to FIG. 5(A)).

Subsequently, the first document is separated by the separation roller 42, and transferred toward a space between the register roller 44 and the register auxiliary roller 45. Then, T1 time or time period after the document is detected by the register sensor 51, the paper supply motor M1 is stopped.

Figure 5A:
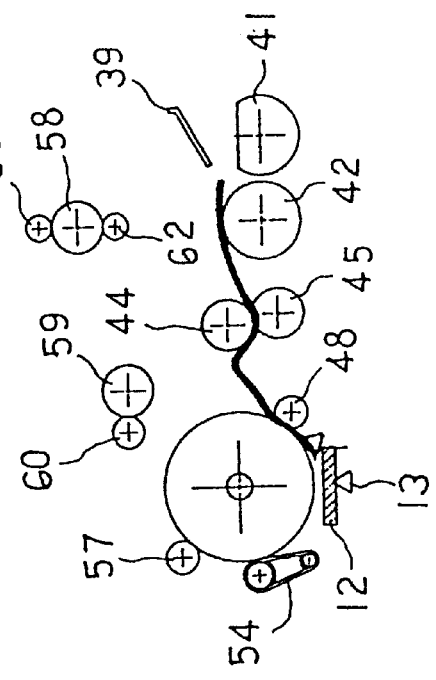
Figure 5C:
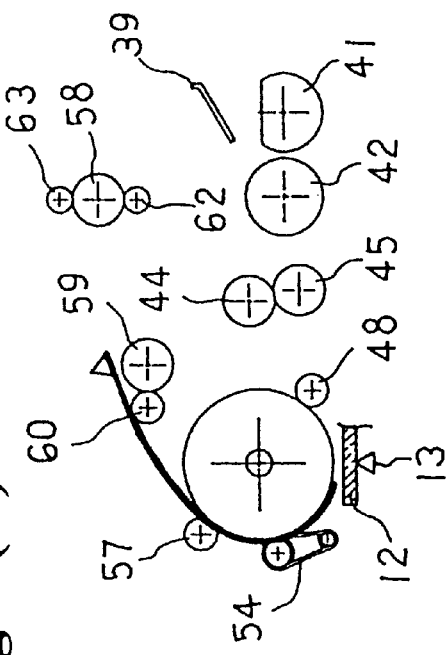
Figure 5B:
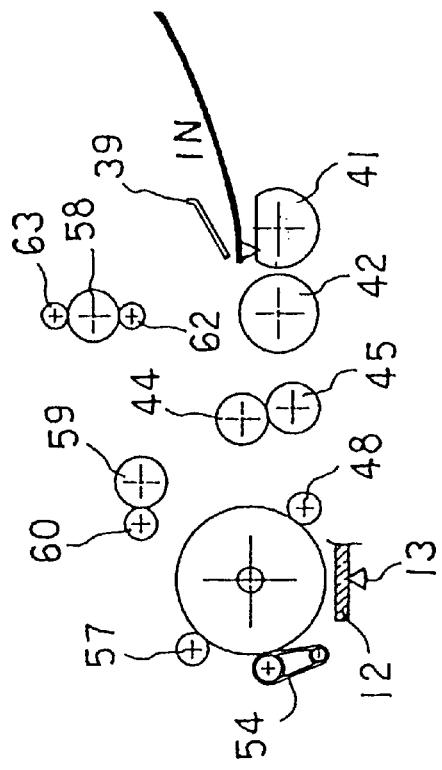

Meanwhile, the leading edge of the document abuts against the register roller 44 to be aligned, and becomes a standby condition (referring to FIG. 5(B)). Thereafter, the paper supply motor M1 is rotated reversely, and the document is transferred by the both rollers 44 and 45. When the paper supply motor M1 is rotated reversely, at the same time, the transfer motor M3 is driven, so that the document is transferred toward the reading means 13. After the leading edge of the document is detected by a read sensor 52, the paper supply motor M1 and the transfer motor M3 are stopped, and the leading edge of the document is once stopped just before the reading means 13 (referring to FIG. 5(C)).

The document which is stopped once is transferred onto the reading means 13 by the transfer motor M3 which is actuated again based on a reading signal from the reading means 13, and T2 time after the actuation of the transfer motor M3, one surface of the document is read by the reading means 13; at the same time, a paper ejection sensor 65 is turned on, and the paper ejection motor M2 is driven to rotate. After a short time, the rear edge of the document is detected by the read sensor 52, and T3 time after this detection, it is recognized that reading the document is finished, and a rotation speed of the transfer motor M3 is changed such that the document is transferred at the highest speed. Also, when the rear edge of the first document is detected by the read sensor 52, by forward rotation of the paper supply motor M1, a second document on the stack part 17*a* of the cover main body 17 is supplied and similarly transferred.

In the transferring steps, when the first document passes above the reading means 13 by rotation of the feed roller 32, the leading edge of the document hits and contacts with the transfer belt 54, and the document is pulled up toward a rotation direction of the transfer belt 54.

Figure 5D:
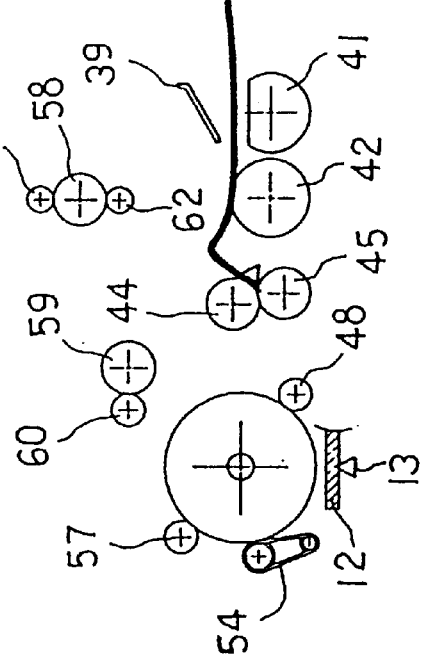

Subsequently, the first document is led to the first paper ejection path 36 by the transfer belt 54 and the roller 57 (referring to FIG. 5(D) and FIG. 5(E)). Then, T4 time after the rear edge of the document is detected by the paper ejection sensor 65, the paper ejection motor M2 is stopped, and after a short time, the forward and reverse roller 58 is rotated reversely by a reverse rotation of the motor M2. Accordingly, by the forward and reverse roller 58 and the first paper ejection auxiliary roller 63, the leading edge of the document in the paper ejection direction is exposed from the first paper ejection outlet 30, and then is switched back. Namely, the document is transferred again to the first paper ejection path 36 (referring to FIG. 5(F)).

The document is guided from the first paper ejection path 36 to the second paper ejection path 37 by the Mylar 28, and nipped between the intermediate driving roller 59 and the intermediate driving auxiliary roller 60 (referring to FIG. 5(G)). When the document is nipped between the intermediate driving roller 59 and the intermediate driving auxiliary roller 60, the first paper ejection auxiliary roller 63 is separated from the forward and reverse roller 58. And, the document is transferred through the second paper ejection path 37, and ejected through the second paper ejection outlet 31 (referring to FIG. 5(H)).

T5 time after ejecting the document is finished and the paper ejection motor M2 is stopped, the paper ejection motor M2 is rotated forward and the first paper ejection auxiliary roller 63 is pressed against the forward and reverse roller 58. On the other hand, the subsequent second document passes the same paths such that one surface thereof is read, switched back similarly, and ejected through the second paper ejection outlet 31.

Next, by using FIG. 4 and FIG. 6(A) through FIG. 6(I), copying both sides of two documents will be explained. In FIG. 4 and FIG. 6(A) through FIG. 6(I), when documents are placed on the stack part 17*a* of the cover main body 17, the empty sensor 50 is turned on. An operation of the document transfer part 18 is started from this condition, the paper supply motor M1 is rotated forward, and the documents are displaced by the paper supply roller 41 and a guide plate 24*b* (referring to FIG. 6(A)).

Subsequently, the document is separated by the separation roller 42, and transferred toward the space between the register roller 44 and the register auxiliary roller 45. Then, t1 time after the document is detected by the register sensor 51, the paper supply motor M1 is stopped. Meanwhile, the leading edge of the document abuts against the register roller 44 to be aligned, and becomes a standby condition (referring to FIG. 6(B)). Thereafter, the paper supply motor M1 is rotated reversely, and the document is transferred by the both rollers 44 and 45. When the paper supply motor M1 is rotated reversely, simultaneously, the transfer motor M3 is actuated such that the document is transferred to the reading means 13. After the leading edge of the document is detected by the read sensor 52, the paper supply motor M1 and the transfer motor M3 are stopped, and the leading edge of the document is stopped once just before the reading means 13 (referring to FIG. 6(C)). The document once stopped is transferred by the transfer motor M3, which is actuated again based on the read signal from the reading means 13, onto the reading means 13, and t2 time after the actuation of the transfer motor M3, one surface of the document is read by the reading means 13. At the same time, the paper ejection sensor 65 is turned on, and the paper ejection motor M2 is actuated to rotate. After a short time, the rear edge of the document is detected by the read sensor 52, and t3 time after this detection, it is recognized that reading is finished, and a rotation speed of the transfer motor M3 is changed, so that the document is transferred at the highest speed.

In this transferring steps, when the first document passes above the reading means 13 by a rotation of the feed roller 32, the leading edge of the document hits and contacts with the transfer belt 54, and the document is pulled up toward the rotation direction of the transfer belt 54. Subsequently, the first document is led to the first paper ejection path 36 by the transfer belt 54 and the roller 57 (referring to FIG. 6(D)).

Thereafter, t4 time after the rear edge of the document is detected by the paper ejection sensor 65, the paper ejection motor M2 is stopped, and immediately thereafter, the forward and reverse roller 58 is rotated reversely by the reverse rotation of the paper ejection motor M2. Accordingly, by means of the forward and reverse roller 58 and the first paper ejection auxiliary roller 63, the leading edge of the document in the paper ejection direction is exposed from the first paper ejection outlet 30, and is switched back. Namely, the document is again transferred to the first paper ejection path 36 (referring to FIG. 6(E)).

Figure 6A:
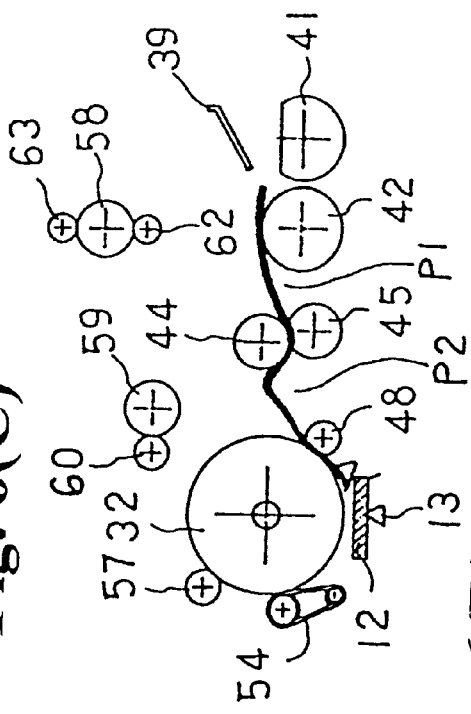
FIG. 6(A) through FIG. 6(I) are schematic views showing a flow of the document by time series when the double-sided document is read from a front surface thereof.
Figure 6C:
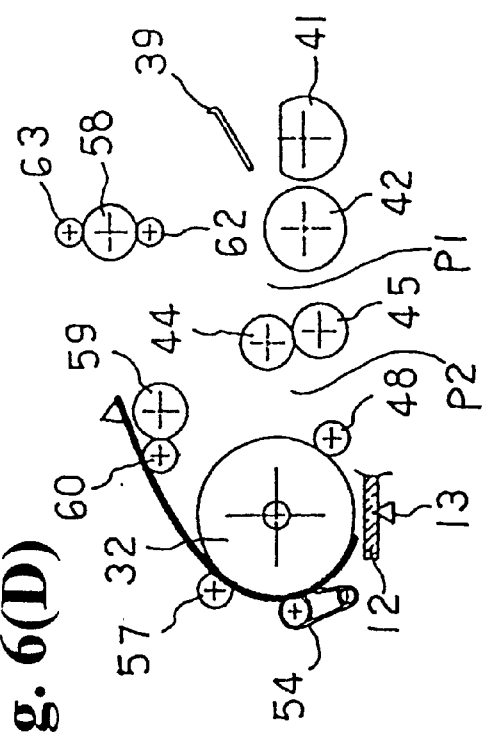
Figure 6B:
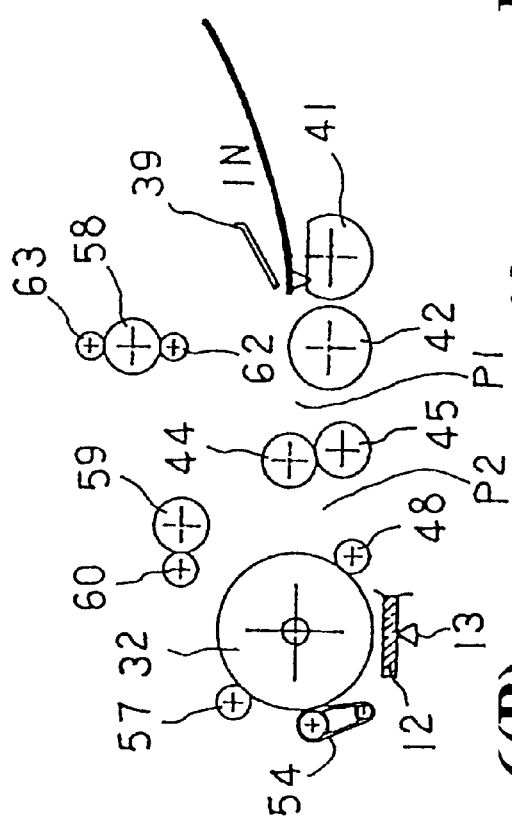
Figure 6D:
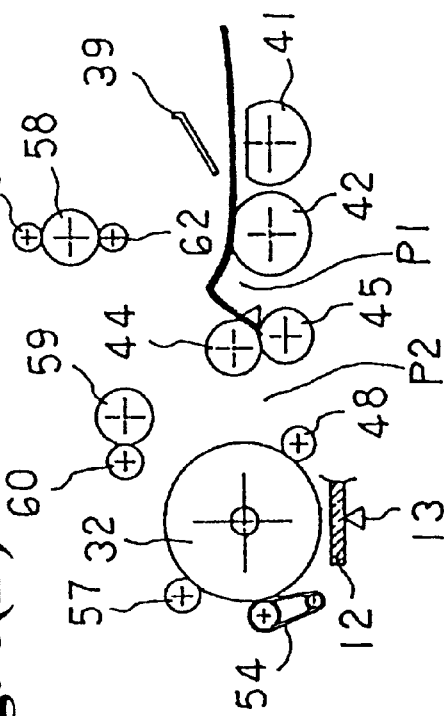
Figure 6E:
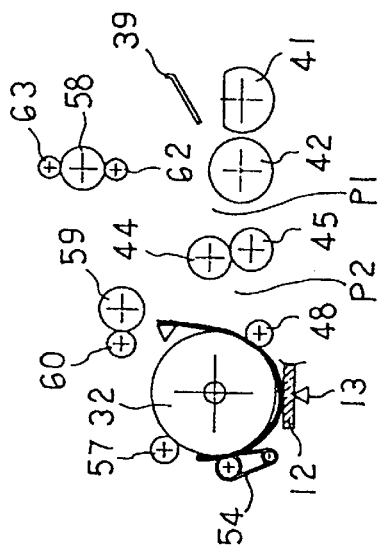
Figure 6F:
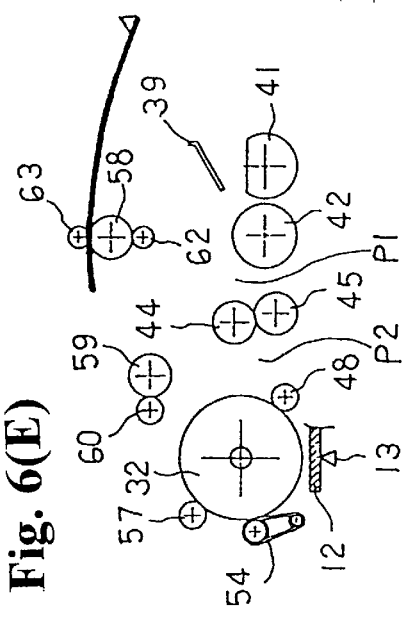

At this time, the document is guided by the Mylar 28 from the first paper ejection path 36 to the first circulation path 38*a*, and nipped between the intermediate driving roller 59 and the intermediate driving auxiliary roller 60 (referring to FIG. 6(F)). The document is transferred by these rollers 59 and 60, and guided to the paper supply path 38 through the circulation path 33.

In this case, when the document is nipped between the intermediate driving roller 59 and the intermediate driving auxiliary roller 60, the first paper ejection auxiliary roller 63 is separated from the forward and reverse roller 58.

The leading edge of the document is detected again by the read sensor 52, and immediately thereafter, the paper ejection motor M2 is stopped, and the leading edge of the document is once paused just before the reading means 13. Then, the document is transferred onto the reading means 13 by the transfer motor M3, which is actuated again based on the read signal from the reading means 13, and t2 time after the actuation of the transfer motor M3, the other surface of the document is read by the reading means 13. At the same time, the paper ejection sensor 65 is turned on, the leading edge of the document reaches between the first paper ejection auxiliary roller 63 and the forward and reverse roller 58, which are spaced away from each other, and the leading edge passes by the rear edge side of the document. Immediately thereafter, the rear edge of the document is detected by the read sensor 52, and when it is recognized that reading the document is finished, the paper ejection motor M2 is rotated forward, and the first paper ejection auxiliary roller 63 presses against the forward and reverse roller 58. Then, t3 time after a forward rotation of the paper ejection motor M2, a rotation speed of the transfer motor M3 is changed, and the document is transferred at the highest speed.

Figure 6G:
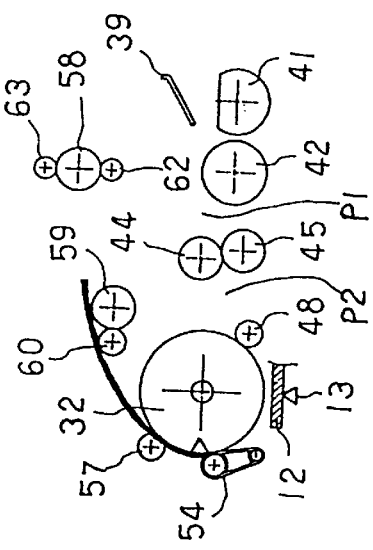
Figure 6H:
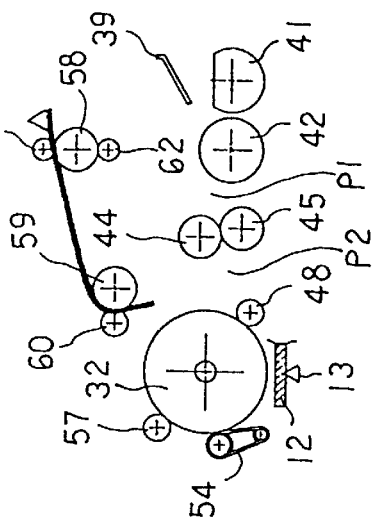
Figure 6I:
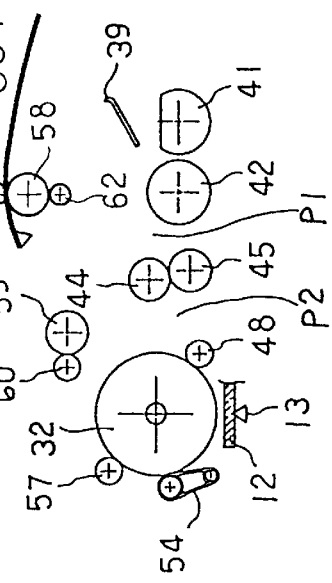
Figure 7A:
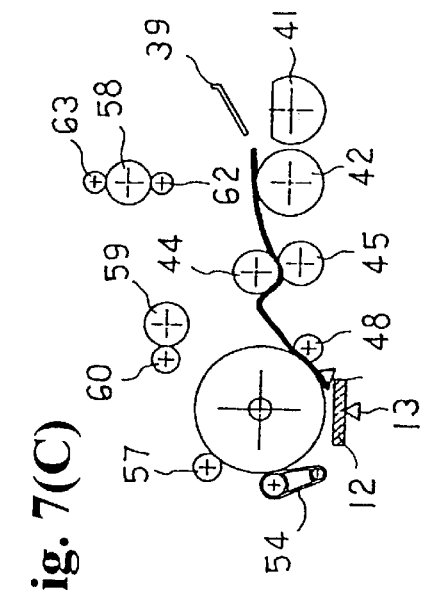
Figure 7B:
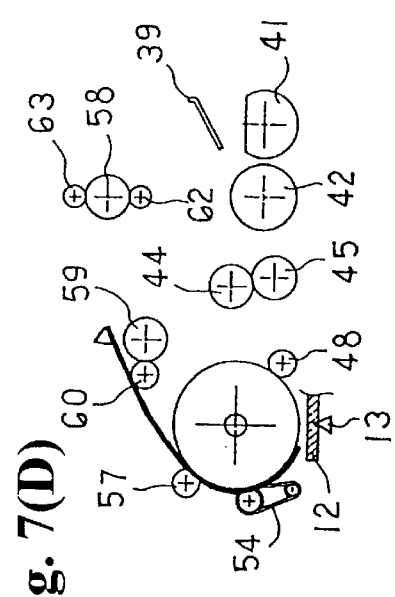
Figure 7C:
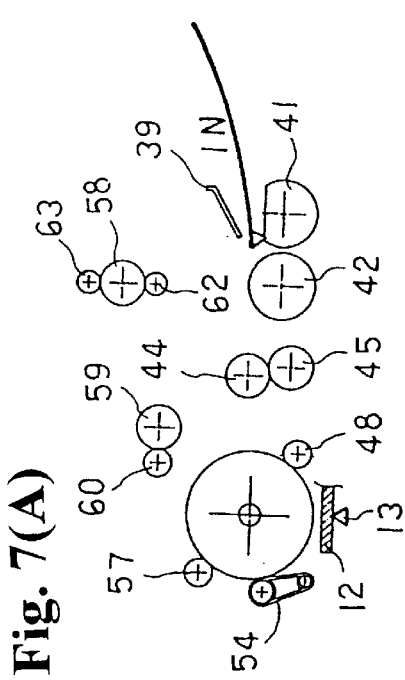
Figure 7D:
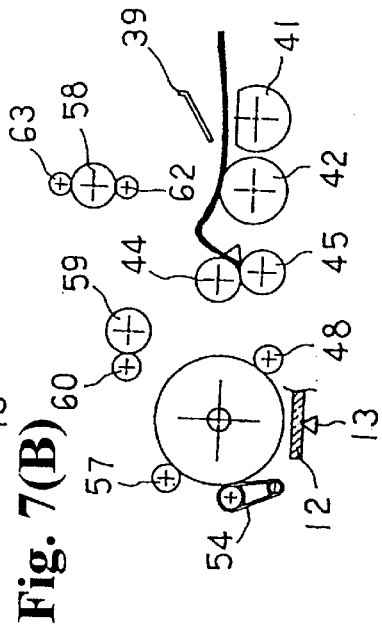
Figure 7E:
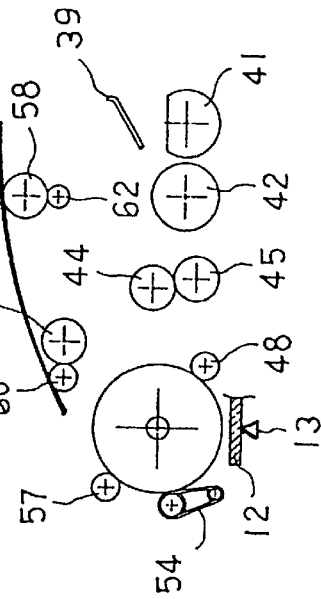

In this transferring steps, when the first document passes above the reading means 13 by the rotation of the feed roller 32, the leading edge of the document hits and contacts with the transfer belt 54, and the document is pulled up toward the rotation direction of the transfer belt 54 (referring to FIG. 6(G)). Subsequently, the first document is led to the first paper ejection path 36 by the transfer belt 54 and the roller 57 (referring to FIG. 6(H)).

Subsequently, when the rear edge of the document is detected by the paper ejection sensor 65, the paper supply motor M1 is actuated to rotate, such that the second document is supplied and transferred in the same paths as in the first document, and both sides of the document are read. On the other hand, the first document passes through the first paper ejection path 36, and ejected through the first paper ejection outlet 30 by the forward and reverse roller 58 which is rotated forward and the first paper ejection auxiliary roller 63 (referring to FIG. 6(I)). Incidentally, the subsequent second document is similarly ejected through the first paper ejection outlet 30 after both sides thereof are read.

Furthermore, the case when a double-sided document is copied from a rear surface thereof will be explained by the schematic views of FIG. 7(A) through FIG. 7(J) and FIG. 8(K) through FIG. 8(Q). The document, which is placed to face down on the stack part 17a, is supplied by the paper supply roller 41 (referring to FIG. 7(A)), and in the condition where the document is separated by the separation roller 42, the document is supplied between the register roller 44 and the register auxiliary roller 45 (referring to FIG. 7(B)). Then, the document is led to a rear end of the paper supply path 33 by these respective rollers 44 and 45 (referring to FIG. 7(C)), and passes through the reading means 13 while a front surface of the document is not read by the reading means 13 (referring to FIG. 7(D)), and is led from the transfer path 35 to the first paper ejection path 36 by the transfer belt 54 and the roller 57 (referring to FIG. 7(E)). After the ejection leading edge of the document is exposed from the first paper ejection outlet 30, the forward and reverse roller 58 is rotated reversely (referring to FIG. 7(F)), the document is reversely transferred in the first paper ejection path 36, passes through the circulation path 35, and is led to the intermediate part of the supply paper path 33 (referring to FIG. 7(G)). Then, a rear surface of the document is read by the reading means 13 (referring to FIG. 7(H)), the document is led to the transfer path 35 (referring to FIG. 7(I)), and is again led to the first paper ejection path 36 (referring to FIG. 7(J)).

Figure 8M:
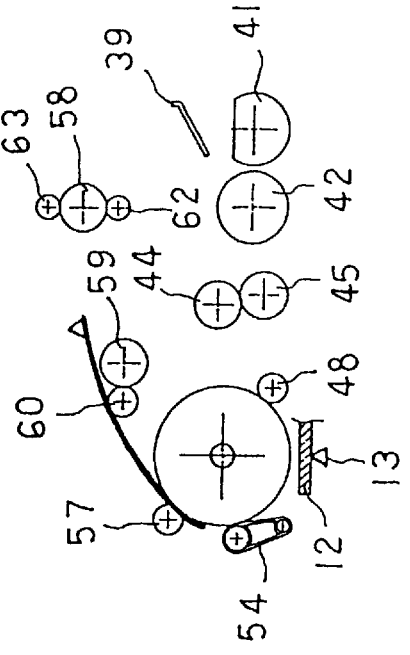
Figure 8N:
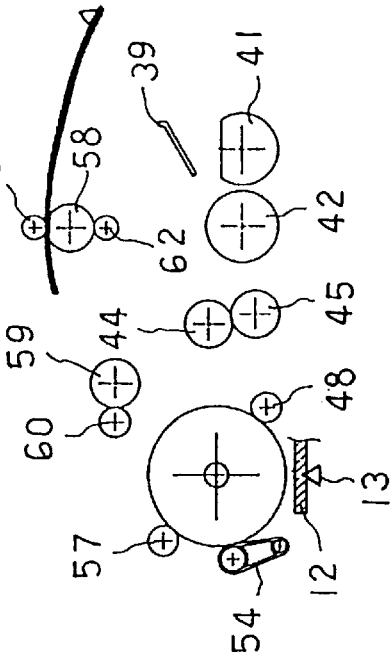
Figure 8K:
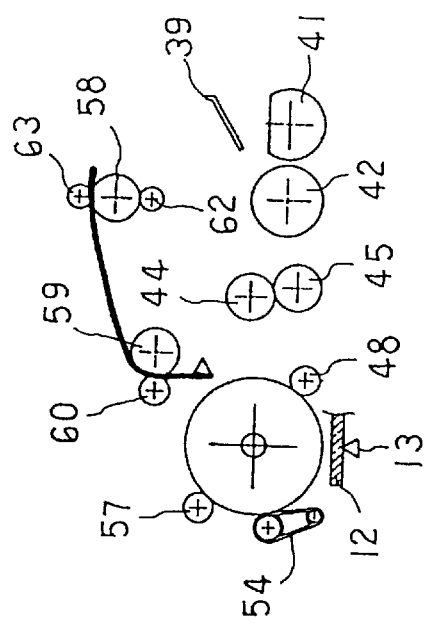
Figure 8L:
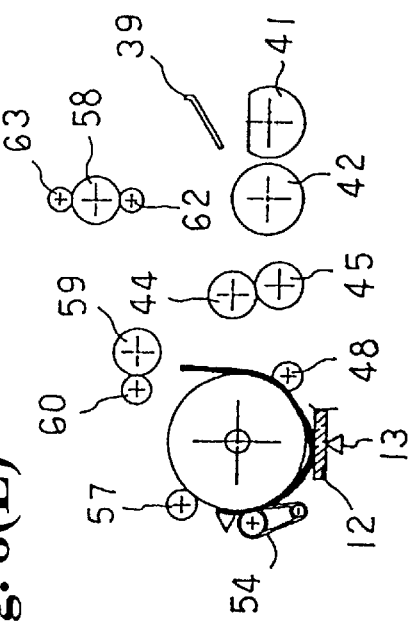
Figure 8O:
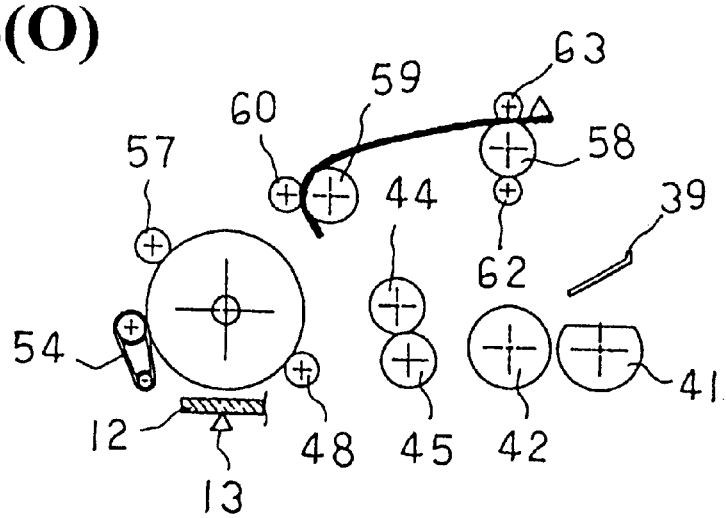
Figure 8P:
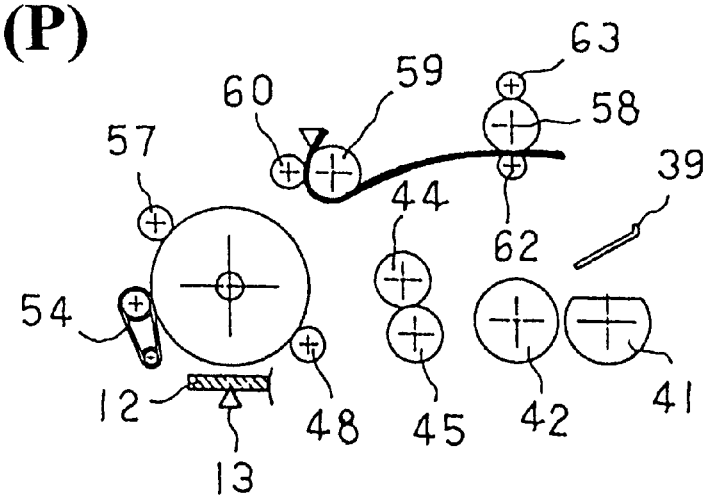
Figure 8Q:
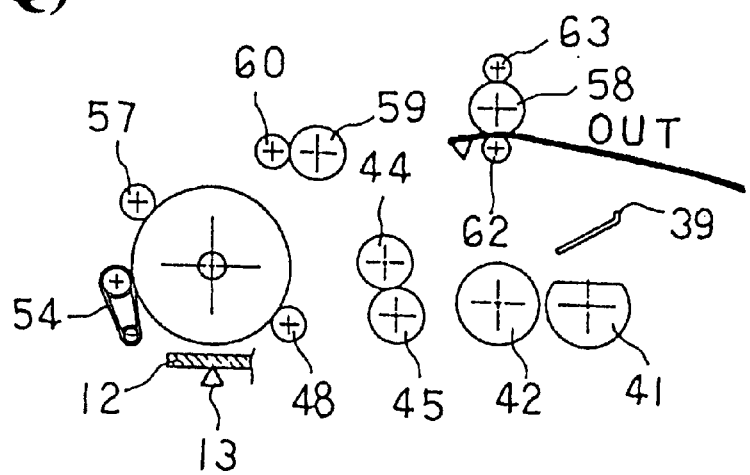
Figure 9C:
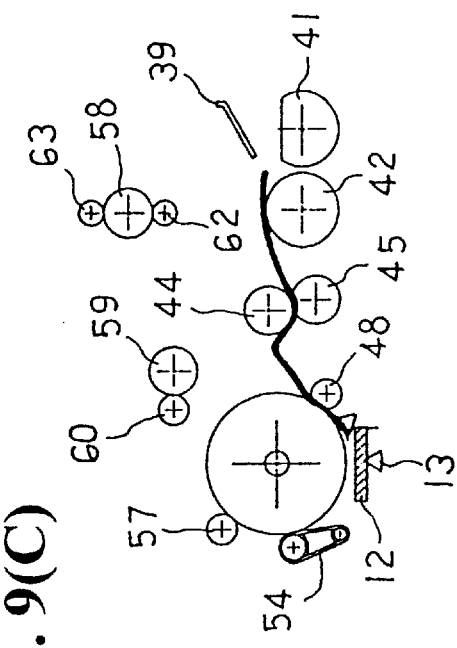
Figure 9D:
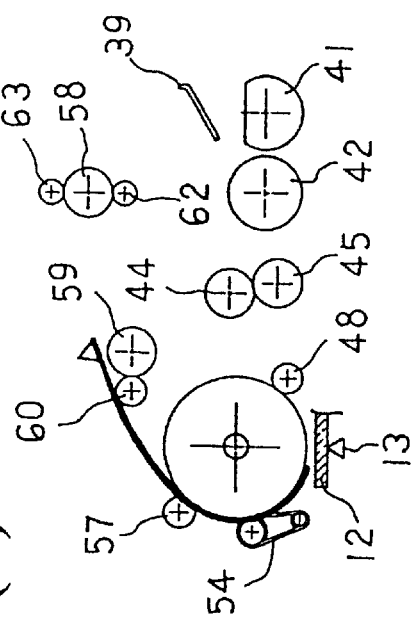
Figure 9A:
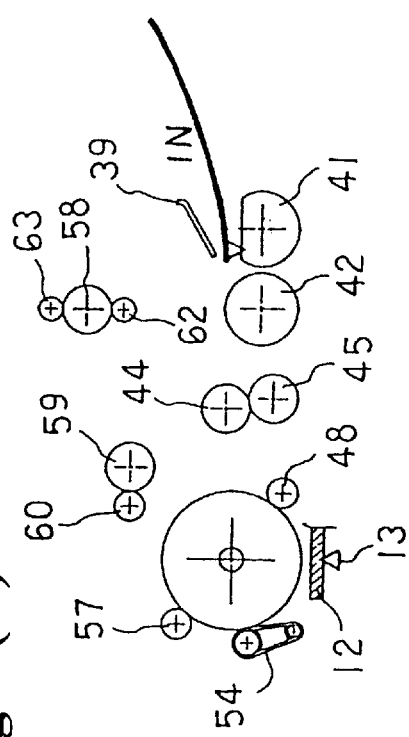
Figure 9B:
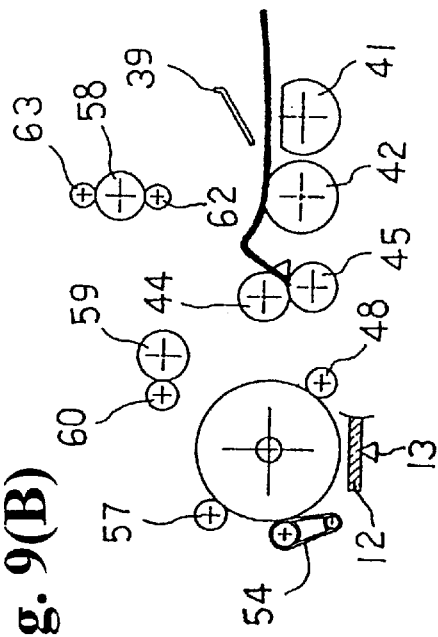
Figure 9G:
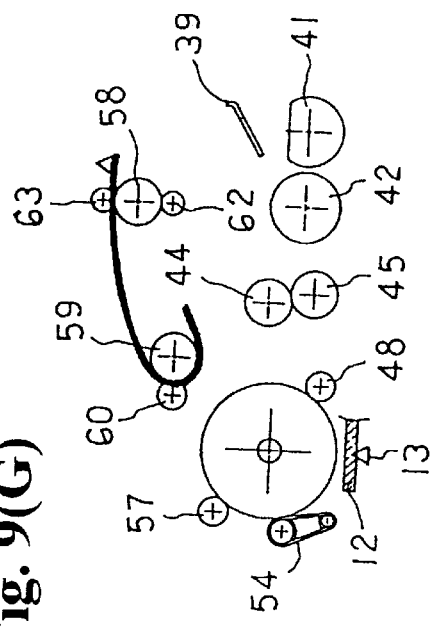
Figure 9H:
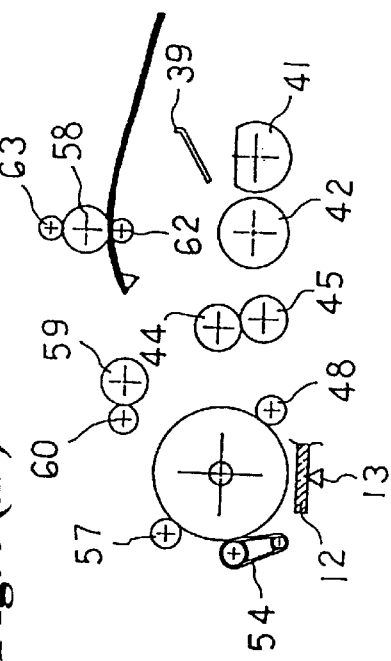
Figure 9E:
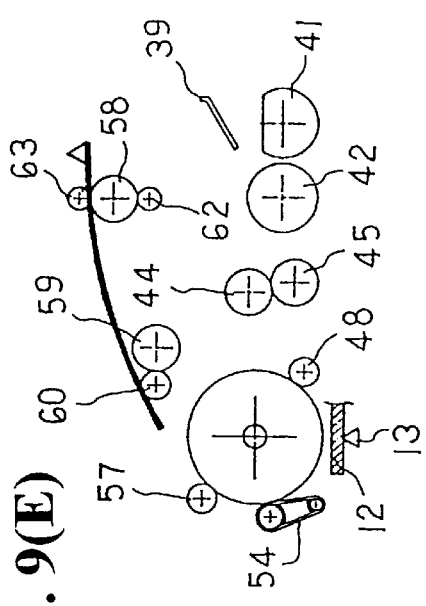
Figure 9F:
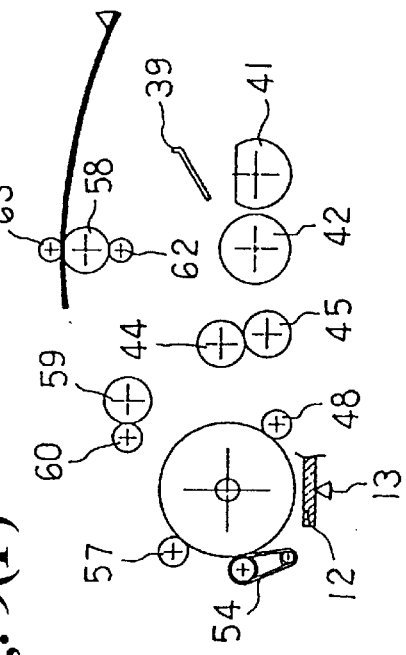

Since the front surface of the document is not read if the document is ejected as it is, the document is again reversely transferred in the first paper ejection path 36, passes through the circulation path 38, and is led to the intermediate part of the paper supply path 33 (referring to FIG. 8(K)). Then, the front surface of the document is read by the reading means 13 (referring to FIG. 8(L)), and the document is led from the transfer path 35 to the first paper ejection path 36 (referring to FIG. 8(M)). After the ejection leading edge of the document is exposed from the paper ejection outlet 30, the forward and reverse roller 58 is reversely rotated (referring to FIG. 8(N)), the document is reversely transferred in the circulation path 38 (referring to FIG. 8(O)), and is led to the second paper ejection path 37 (referring to FIG. 8(P)). And, by cooperation of the forward and reverse roller 58 and the second paper ejection auxiliary roller 62, the document is ejected from the second paper ejection outlet 31 such that the ejection leading edge of the document is placed onto the paper ejection plate 17b (referring to FIG. 8(Q)).

Further, the case when a single-sided document is analog-copied (plurally) is explained by referring to FIG. 9(A) through FIG. 10(M). The document placed on the stack part 17a is temporarily separated by the paper supply roller 41 (referring to FIG. 9(A)), the document becomes a separation condition by the separation roller 42 and the separation pad 43, and is supplied between the register roller 44 and the register auxiliary roller 45 (referring to FIG. 9(B)). Then, the document is transferred to the rear end of the paper supply path 33 by these rollers 44 and 45 (referring to FIG. 9(C)), the document for the first time is read by the reading means 13 (referring to FIG. 9(D)), and is led to the first paper ejection path 36 by the transfer belt 54 and the roller 57 (referring to FIG. 9(E)). After the ejection leading edge of the document is exposed from the paper ejection outlet 30, the forward and reverse roller 58 is reversely rotated (referring to FIG. 9(F)), the document is reversely transferred in the first paper ejection path 36 and led to the second paper ejection path 37 (referring to FIG. 9(G)). By cooperation of the forward and reverse roller 58 and the second paper ejection auxiliary roller 62, the ejection leading edge of the document is exposed from the second paper ejection outlet 31 (referring to FIG. 9(H)). Then, the document for the second time is read by the reading means 13 (referring to FIG. 10(I)), and is led to the first paper ejection path 36 (referring to FIG. 10(J)). After the ejection leading edge of the document is exposed from the first paper ejection outlet 30, the forward and reverse roller 58 is reversely rotated (referring to FIG. 10(K)), and the document is reversely transferred in the first paper ejection path 36 and led to the second paper ejection path 37 (referring to FIG. 10(L)). By cooperation of the forward and reverse roller 58 and the second paper ejection auxiliary roller 62, the document is ejected from the second paper ejection outlet 31 such that the ejection rear edge of the ejected document is placed on the paper ejection plate 17b (referring to FIG. 10(M)).

Incidentally, when making three or more copies, the document is not ejected in the condition shown in FIG. 10(M), and operations from FIG. 9(H) to FIG. 10(M) are repeated, so as to enable making three or more copies.

What is claimed is:

1. An automatic document feeder comprising,
   a paper supply inlet and a first paper ejection outlet disposed above the paper supply inlet,
   a paper supply path for leading a document supplied from the paper supply inlet to a reading section,
   a paper ejection path for leading the document from the reading section to the first paper ejection outlet,
   a circulation path connected to the paper ejection path for reversing a transfer direction of the document and extending to the paper supply path,
   a document reversing path directly connected to the paper ejection path for reversing front and rear surfaces of the document and extending to a second paper ejection outlet different from said first paper ejection outlet, and
   a paper ejection stacker for receiving and holding a document ejected from the first and second paper election outlets.

2. An automatic document feeder according to claim 1, wherein the first paper ejection outlet of the paper ejection path is disposed in an upper side and the second paper ejection outlet of the document reversing path is disposed in a lower side.

3. An automatic document feeder according to claim 1, wherein the paper supply inlet of the paper supply path is disposed in a lower side and the first paper ejection outlet of the paper ejection path is disposed in an upper side, said first paper ejection outlet being provided with a paper ejection stacker extending therefrom, said second paper ejection outlet of the document reversing path being disposed between the first paper ejection outlet and the paper ejection stacker.

4. An automatic document feeder according to claim 1, wherein the paper supply inlet is disposed in a lower side and the first paper ejection outlet of the paper ejection path is disposed in an upper side, said paper supply inlet being provided with a tray for placing the document to extend therefrom, said tray having a supplied document thereon and storing the document ejected from the first paper ejection outlet to be placed on the supplied document.

5. An automatic document feeder according to claim 1, further comprising a transfer roller capable of rotating forward and reversely disposed in the document reversing path, and a second circulation path extending to the paper supply path to reverse the transfer direction of the document whose front and rear surfaces are reversed.

6. An automatic document feeder according to claim 1, further comprising a paper ejection rotating member facing the first paper ejection outlet of the paper ejection path and the second paper ejection outlet of the document reversing path which are spaced away from each other vertically, a driving motor for rotating the paper ejection rotating member forward and reversely, a pinch roller engaging with the paper ejection rotating member in the paper ejection path, and a pinch roller engaging with the paper ejection rotating member in the document reversing path.

7. An automatic document feeder comprising, a paper supply inlet and a first paper ejection outlet disposed above the paper supply inlet, a paper supply path for leading a document supplied from the paper supply inlet to a reading section, a transfer path for leading the document from the reading section, a paper ejection path extending from the transfer path to the first paper ejection outlet, a circulation path communicating between the paper ejection path and the paper supply path, said circulation path reversing a transfer direction of the document located in the paper ejection path and providing the document to the paper supply path, and a document reversing path connected to the paper ejection path for reversing front and rear surfaces of the document and having a second paper ejection outlet disposed under the first paper ejection outlet, said document reversing path communicating with the paper supply path.

8. An automatic document feeder according to claim 7, wherein said reversing path extends between the paper ejection path and the second paper ejection outlet directly to form a second paper ejection path.

9. An automatic document feeder according to claim 8, wherein said circulation path includes a first circulation path extending from the paper ejection path to the paper supply path, and a second circulation path extending from the second paper ejection outlet to the paper supply path.

10. An automatic document feeder according to claim 9, further comprising switching means disposed in the reversing path, said switching means changing a direction of a document transferred from the paper ejection path to one of the second paper ejection outlet and the paper supply path.

* * * * *